US007555723B1

(12) United States Patent
Coe

(10) Patent No.: US 7,555,723 B1
(45) Date of Patent: Jun. 30, 2009

(54) GUI FOR SELECTIVE COPYING OF DATA

(75) Inventor: Tobias Coe, Stowmarket (GB)

(73) Assignee: British Telecommunications, London (GB)

( * ) Notice: Subject to any disclaimer, the term of this patent is extended or adjusted under 35 U.S.C. 154(b) by 0 days.

(21) Appl. No.: 09/958,846

(22) PCT Filed: May 2, 2000

(86) PCT No.: PCT/GB00/01668

§ 371 (c)(1),
(2), (4) Date: Oct. 15, 2001

(87) PCT Pub. No.: WO00/67123

PCT Pub. Date: Nov. 9, 2000

(30) Foreign Application Priority Data

May 4, 1999 (EP) .................. 99303494

(51) Int. Cl.
*G06F 3/048* (2006.01)
(52) U.S. Cl. .................. 715/769; 715/768
(58) Field of Classification Search ............. 345/769, 345/781, 804, 823, 810
See application file for complete search history.

(56) References Cited

U.S. PATENT DOCUMENTS

| 5,491,784 A | * | 2/1996 | Douglas et al. ............ 715/810 |
| 5,525,978 A | | 6/1996 | York et al. |
| 5,606,674 A | * | 2/1997 | Root ............ 345/769 |
| 5,742,286 A | * | 4/1998 | Kung et al. ............ 345/839 |

FOREIGN PATENT DOCUMENTS

| EP | 0422784 A2 | 4/1991 |
| EP | 0548709 A2 | 6/1993 |
| EP | 0606684 A1 | 7/1994 |
| EP | 0785507 A1 | 7/1997 |

OTHER PUBLICATIONS

Microsoft Window NT Explorer, Copy Right 1981-1998.*
Microsoft Window Explorer , Copy right 1981-1998.*
Beir et al, "Toolglass and Magic Lenses: the See Through Interface", Publication date 1993. Conference Title: Proceeding of SIGGRAPH 20th Annual International Conference on Computer Graphics and Interactive Techniques. The Eye of Technology.
Ishii et al, "Integration of Interpersonal Space and Shared Workspace: ClearBoard Design and Experiments", J. Journal:ACM Transactions on Information Systems, vol. II, No. 4, pp. 349-375, Publication date: Oct. 1993.

(Continued)

*Primary Examiner*—Thanh T Vu
(74) *Attorney, Agent, or Firm*—Nixon & Vanderhye PC

(57) ABSTRACT

A computer database amendment tool provide a graphical user interface which enables a user to easily copy each of a selected subset of a group of data items in the database to one or more selected destinations. A representation of a notepad is displayed overlying screens which display information stored in the database. By positioning the notepad representation over a representation of an item stored in the database, and issuing a transfer command, the user is able to copy that item to a storage location in the computer's memory. After the underlying display has been changed, another command may be used to transfer data from the storage location to another database location.

26 Claims, 14 Drawing Sheets

OTHER PUBLICATIONS

Colby et al, "Transparency and Blur as Selective Cues for Complex Visual Information", Proceedings of the SPIE the International Society for Optical Engineering, vol. 1460, pp. 114-125, 1991.

Harrison et al, "Transparent Layered User Interfaces: An Evaluation of a Display Design to Enhance Focused and Divided Attention", CHI '95 Mosiac of Creativity, May 7-11, 1995.

Zhai et al, "The Partial-Occlusion Effect: Utilizing Semitransparency in 3D Human-Computer Interaction", ACM Transactions on Computer-Human Interaction, vol. 3, No. 3, Sep. 1996, pp. 254-284.

Harrison et al, "An Experimental Evaluation of Transparent User Interface Tools and Information Content", UIST '95, Nov. 14-17, 1995, pp. 81-90.

Bier et al, "Taxonomy of See-Through Tools", Human Factors in Computing Systems, CHI '94.

"Bulletin Board Buffer" IBM Technical Disclosure Bulletin, US, IBM Corp. New York, vol. 35, No. 1B, Jun. 1992, pp. 287-288, XP000309068 ISSN:00018-8689.

IBM Technical Disclosure Bulletin, "Clip Tool:A Convenience for Repetitive Clipboard Actions", US, IBM Corp., New York, vol. 37, No. 3, Mar. 1994, p. 305, XP000441483 ISSN:0018-8689.

"Clipboard Interaction Extensions", Research Disclosure, GB, Industrial Opportunities Ltd., Havant, No. 334, Feb. 1992, p. 121, XP000291219 ISSN:0374-4353.

"Speichern Und Kommunizieren Clip-Connect", personal Computer, XX,XX, No. 2, Feb. 1989, p. 90, XP000565509.

"Enhancing the Single Level Clipboard to Provide Multiple Layers Graphically", Research Disclosure, GB, Industrial Opportunities Ltd., Havant, No. 3347, Mar. 1993, p. 200 XP000359895 ISSN:0374-453.

Microsoft Powerpoint Presentation comprising screen shots of the drag-and-drop functionality offered by Windows 98.

Minutes of the oral proceedings before the Examining Division of the European Patent Office in Munich which include a reference in items 4.3.4 and 4.3.5 to a "COM drag and drop framework," which is contained with Microsoft Windows, Jan. 17, 2006.

\* cited by examiner

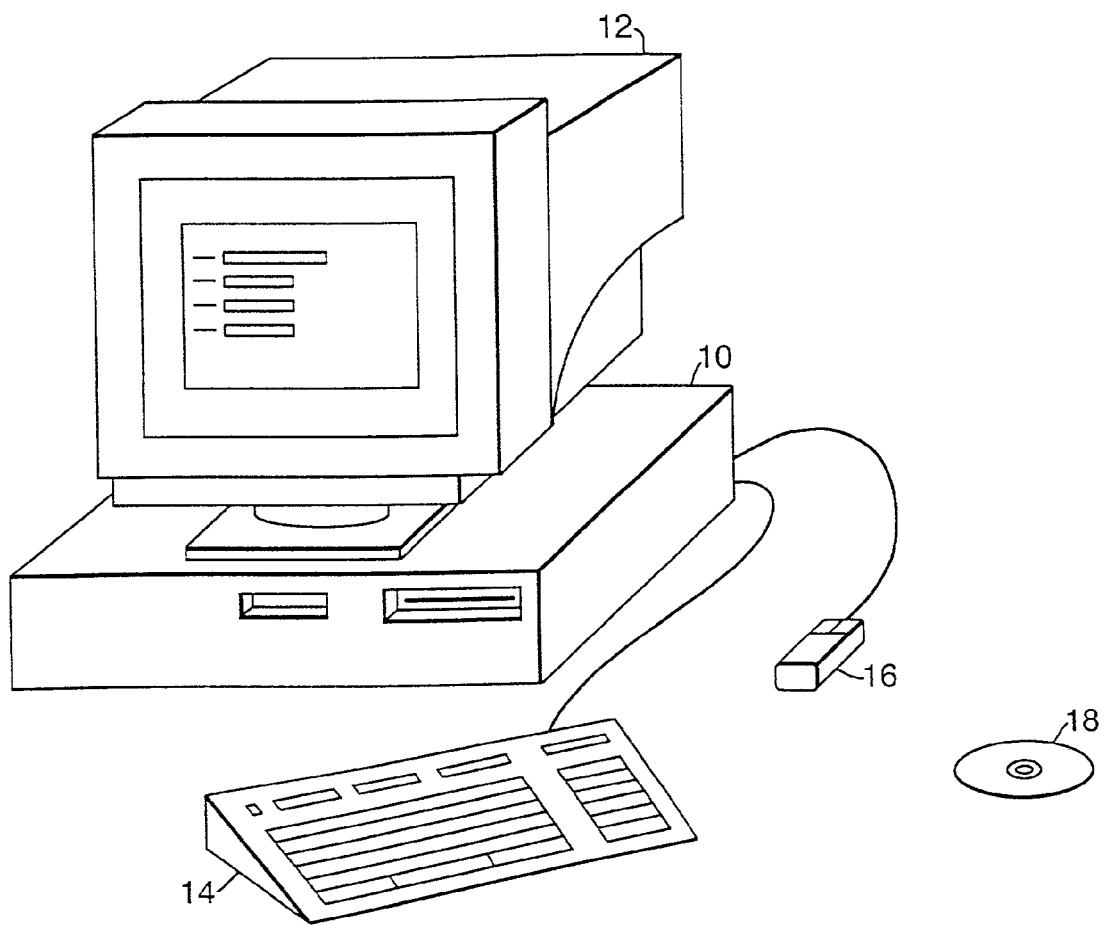

Fig.2A.

| | |
|---|---|
| Abracadabra Instruments Ltd.- (n-10)th Order Number | 20 |
| 'Acme Company Ltd.' | 22 |
| Acme Company Ltd - Customer Number | 23A |
| Acme Company Ltd - First Account Number | 23B |
| Acme Company Ltd - Second Account Number | 23C |
| Acme Company Ltd - Third Account Number | 23D |
| Acme Company Ltd - Fourth Account Number | 23E |
| Acme Company Ltd - Fifth Account Number | 24A |
| Acme Company Ltd - Most Recent Order Number | 24B |
| Acme Company Ltd - Previous Order Number | 24C |
| Acme Company Ltd - (n - 2)th Order Number | |
| Acme Company Ltd - (n - 10)th Order Number | 24J |
| 'Blunkett & Sons' | |

| | |
|---|---|
| Customer Number 1056 - Facsimile | 26 |
| Customer Number 1057 - Customer Name | 28 |
| Customer Number 1057 - Location | 30 |
| Customer Number 1057 - Building | 32 |
| Customer Number 1057 - Town | 34 |
| Customer Number 1057 - Country | 36 |
| Customer Number 1057 - Postcode | 38 |
| Customer Number 1057 - Telephone | 40 |
| Customer Number 1057 - Facsimile | 42 |
| Customer Number 1057 - Contact Name | |
| Customer Number 1058 - Location | |

(25 brackets rows 28–42)

Fig.2C.

| | |
|---|---|
| Order Number 102345 - Level of Service | 46 |
| Order Number 102346 - Customer Name | 48 |
| Order Number 102346 - Contact Name | 50 |
| Order Number 102346 - Product Name | 52 |
| Order Number 102346 - Required by Date | 54 |
| Order Number 102346 - Charge Type | 56 |
| Order Number 102346 - Delivery Method | 58 |
| Order Number 102346 - Level of Service | |
| Order Number 102347 - Contact Name | |

(44 brackets rows 48–58)

Fig.2D.

| | |
|---|---|
| Account Number 1574 - Level of Service | 62 |
| Account Number 1575 - Customer Name | 64 |
| Account Number 1575 - Contact Name | 66 |
| Account Number 1575 - Current Invoice Date | 68 |
| Account Number 1575 - Charges Raised | 70 |
| Account Number 1575 - Telephone Number | 72 |
| Account Number 1575 - Call Itemisation | 74 |
| Account Number 1575 - Level of Service | |
| Account Number 1576 - Customer Name | |

(bracket labeled 60 groups rows 64–74)

Fig.4A.

| | |
|---|---|
| | 150 |
| Jotter Field 1 | 152 |
| Jotter Field 2 | 154 |
| Jotter Field 3 | 156 |
| Jotter Field 4 | 158 |
| Jotter Field 5 | 160 |
| Jotter Field 6 | |

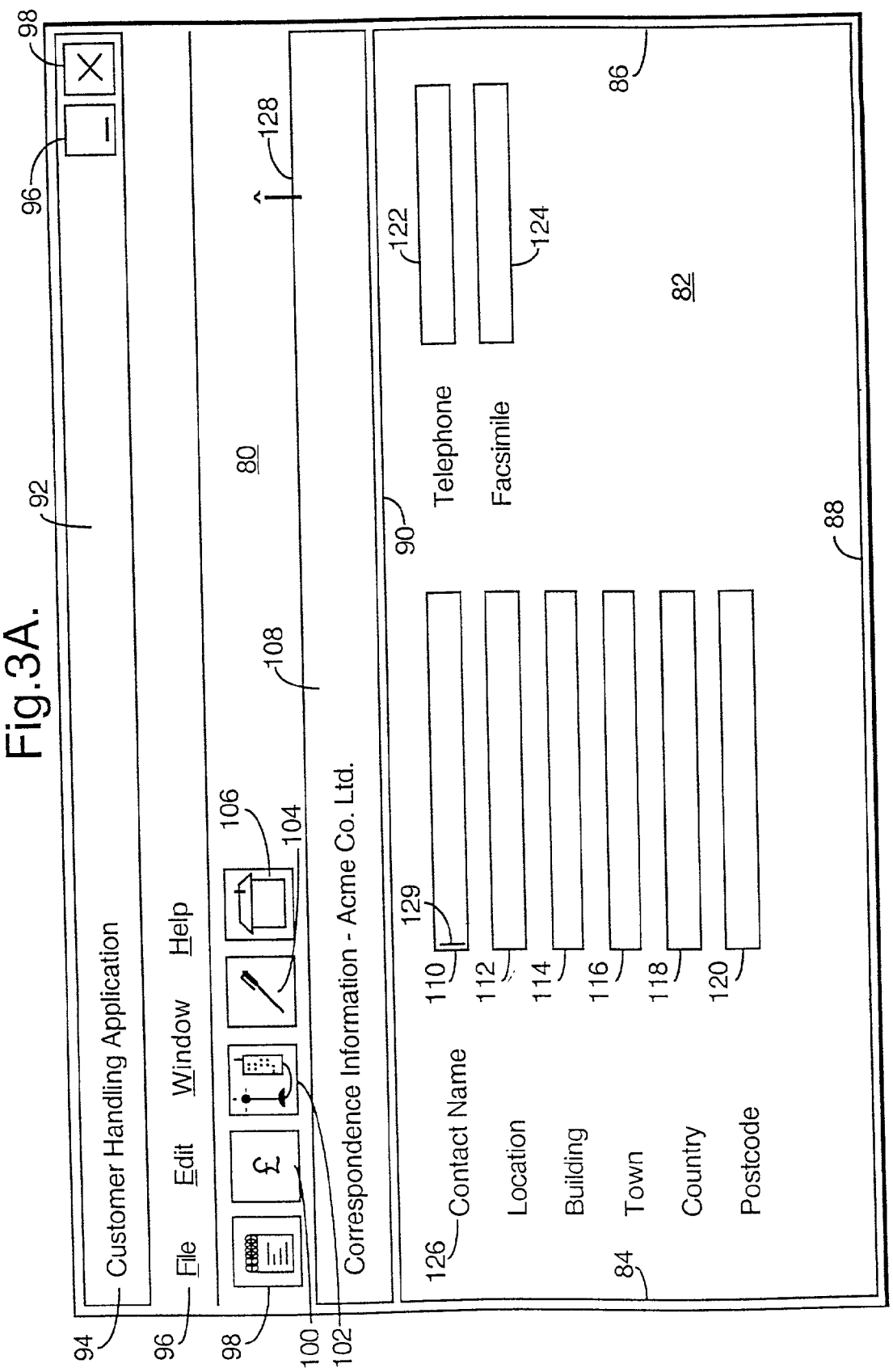

Fig.3B.

Customer Handling Application

File  Edit  Window  Help

Provide Product - Acme Co. Ltd.

Contact Name

Product Name

Required By Date

Charge Type

Delivery Method

Level of Service

Fig. 3C.

Customer Handling Application

File   Edit   Window   Help

Accounts - Acme Co. Ltd.

Contact Name

Current Invoice Date

Charges Raised

Telephone No.

Call Itemisation

Level of Service

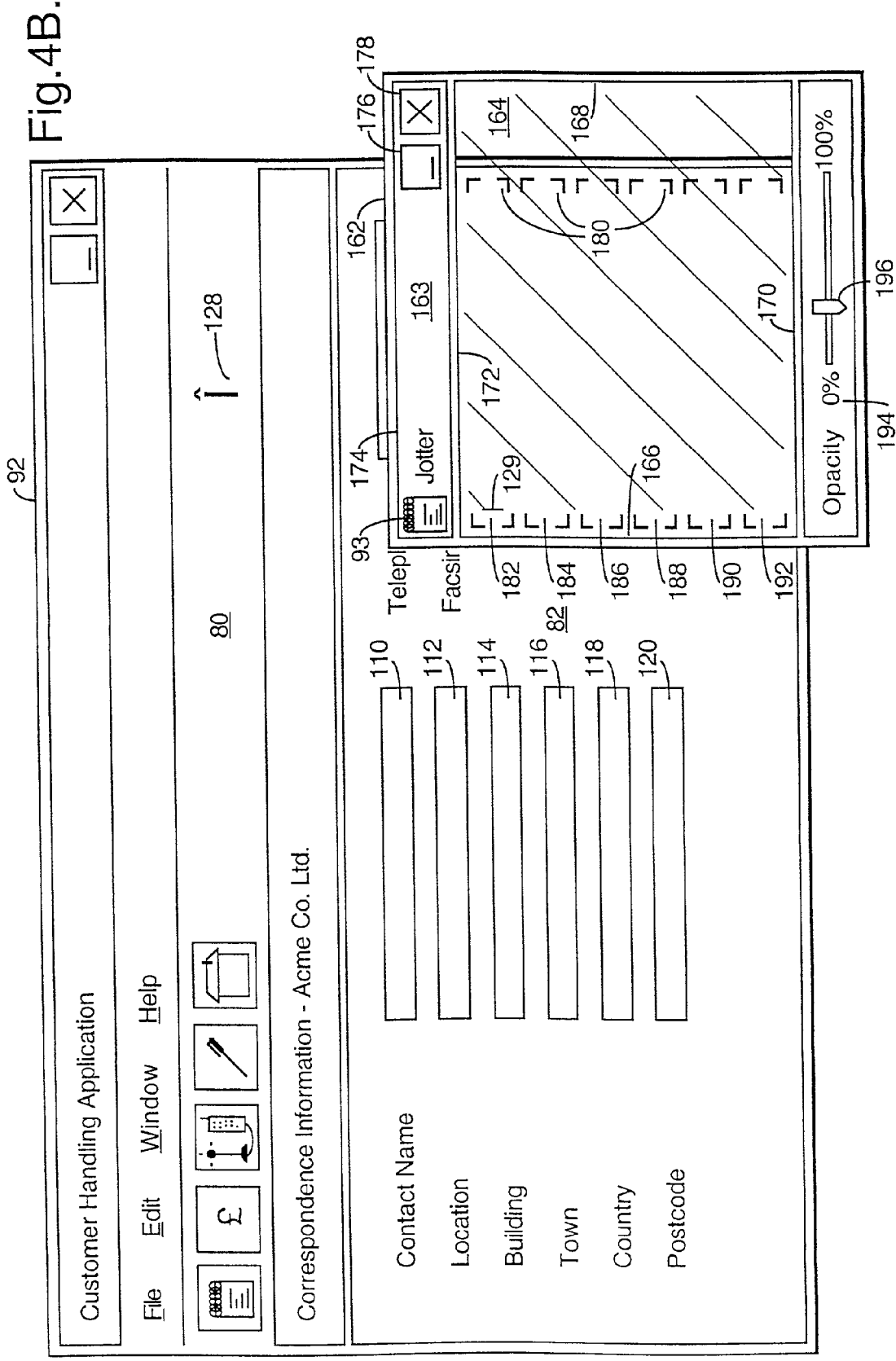

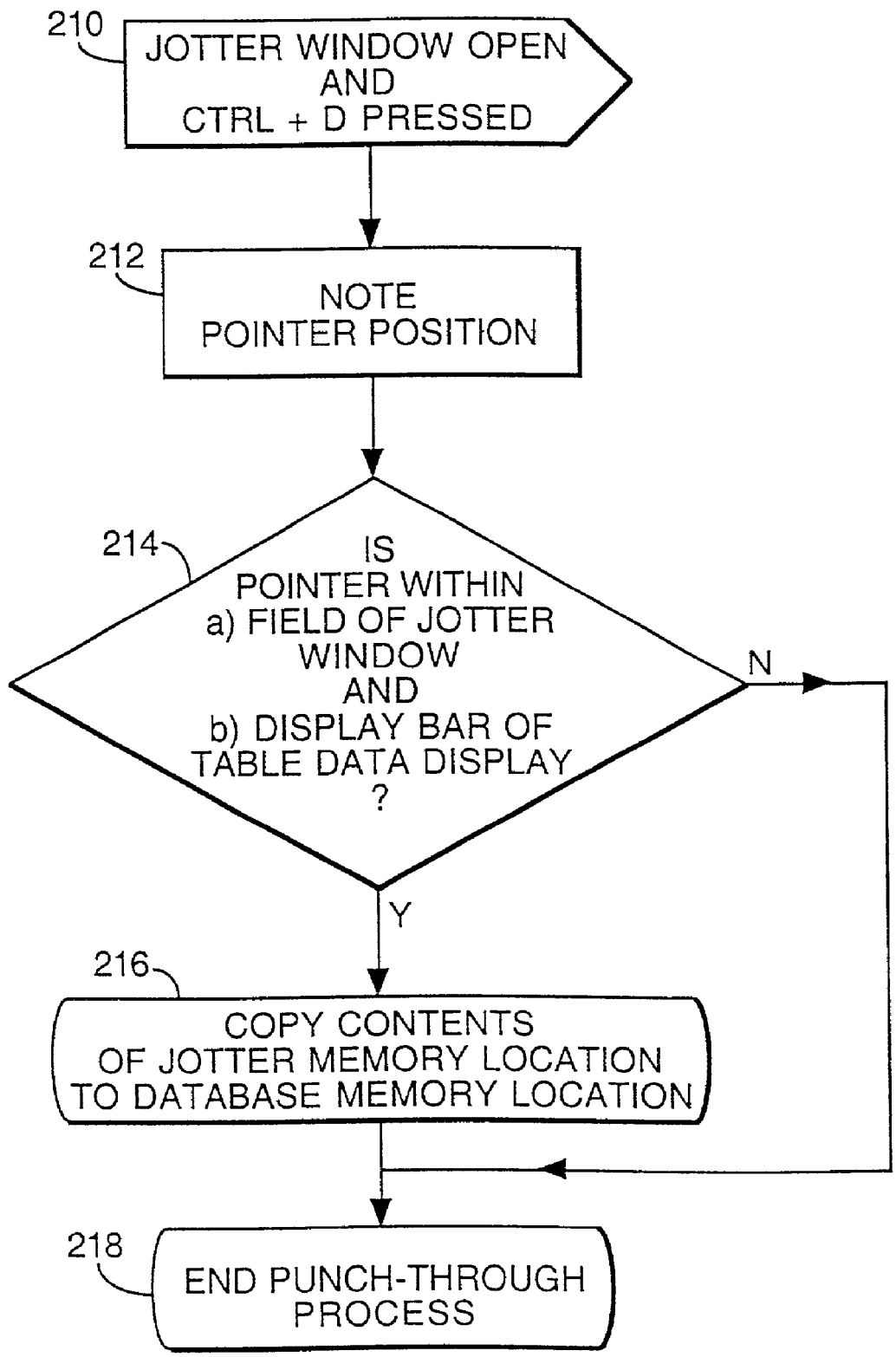

Fig.5A.

Customer Handling Application

File  Edit  Window  Help

98

Correspondence Information - Acme Co. Ltd.

Contact Name   JILL KENWOOD
Location       2ND FLOOR
Building       30-33 LITTLE BRITAIN
Town           LONDON
Country        UNITED KINGDOM
Postcode       EC5 4AZ Telephone   0171 234 5678
Facsimile   0171 345 6789

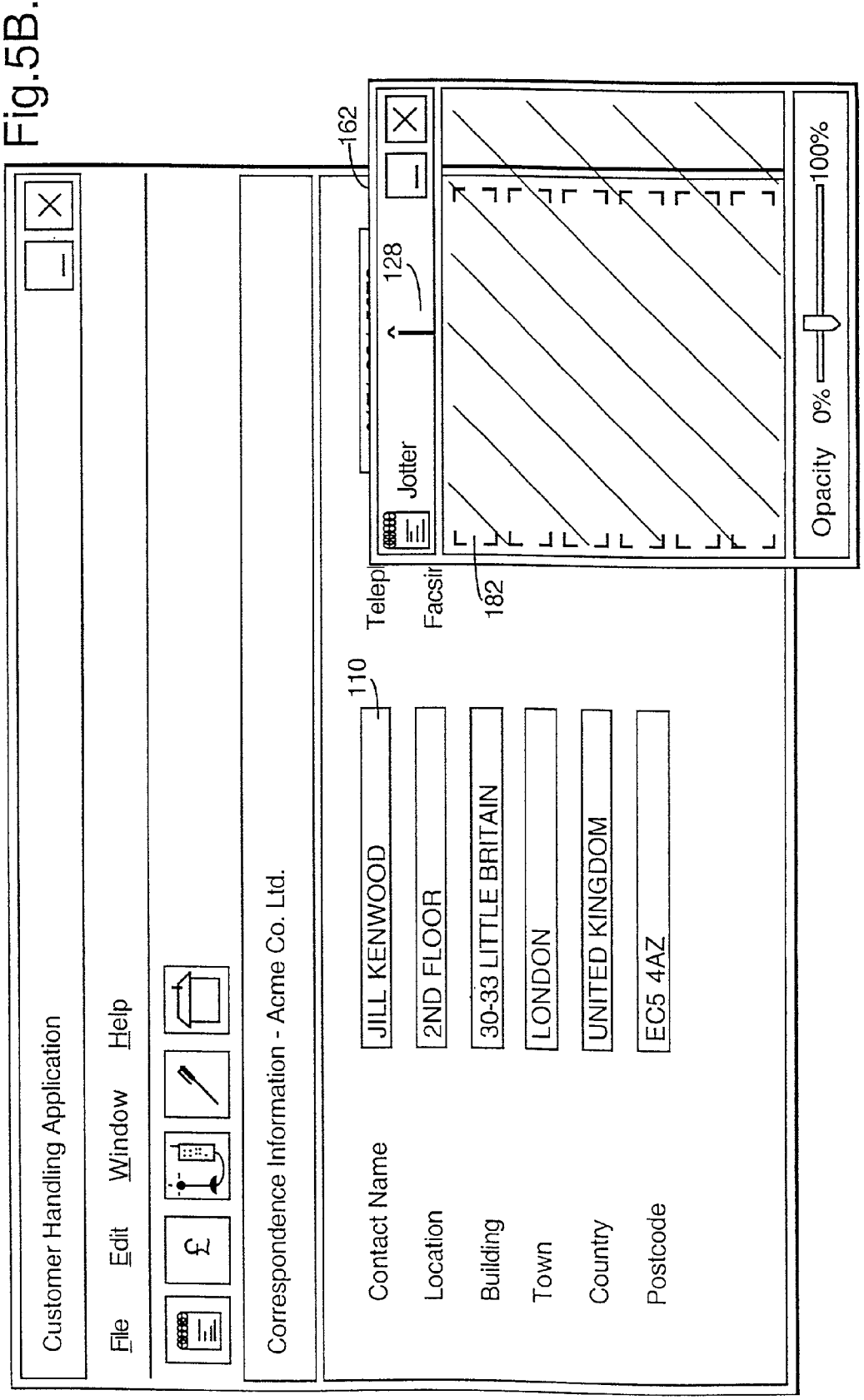

GUI FOR SELECTIVE COPYING OF DATA

BACKGROUND OF THE INVENTION

1. Field of the Invention

The present invention relates to a method of operating a computer to enable a user to cause the copying of a data item from a first set of data to a second set of data. The method results in the computer providing a user with a graphical user interface and has particular utility in relation to methods of operating a computer to provide a tool for updating a database.

2. Related Art

It is now common for computer programs to control a computer to provide the user with a so-called graphical user interface. The graphical user interface provides a two-way interaction. In a first part of the interaction, the computer generates a display which includes graphical elements which represent data stored by the computer or actions that can be carried out by the computer. In a second part of the interaction, the user uses a marker control device to position a marker displayed on the screen. By positioning the marker over the various graphical elements included in the display and operating the marker control device and/or other input devices, the user is able to indicate which data he wishes to manipulate and how he wishes to manipulate it.

Some computer programs (e.g. Microsoft® Excel 97 SR-1) are executable to provide a graphical user interface which enables the user to copy a plurality of data items to a corresponding plurality of storage fields. The user can cause such copying to take place by operating one or more input devices firstly to select a group of data item representations, then to move those representations to storage field representations and finally to indicate that the intended destination has been reached. However, copying a selected subset of a group of data items to respective members of a group of storage fields requires many user operations of the input device(s). There is therefore a need to operate a computer so as to allow a user to copy selected data from one set of memory locations to another set more quickly than has hitherto been possible.

BRIEF SUMMARY

According to a first aspect of the present invention, there is provided a method of operating a computer to enable a user to cause the copying of one or more source data items from a source memory location to one or more storage fields in a storage memory location, said method comprising operating the computer to:

a) generate a display having:
   a source group display comprising a plurality of source representations representing respective source data items stored in said source memory location; and
   a storage group display comprising a plurality of storage representations representing respective storage fields in the storage memory location;

b) move at least one of said group displays responsive to user commands, wherein the representations of said at least one movable group move substantially as a group; and c) selectively copy the source data item represented by one of said source representations to the storage field represented by one of said storage representations responsive to said user at least moving one or both of said source and storage display groups such that said one source representation and said one storage representation substantially coincide.

The present exemplary embodiment of the invention enables a user to copy selected source data items from one set of memory locations to respective selected storage fields in another set of memory locations. The user can cause the items to be copied by positioning a group of source data item representations relative to a group of storage field representations such that one or more of the source data item representations substantially coincide with respective storage field representations. Thus, the user is able to copy selected items of data from one group to another group more quickly and reliably than has hitherto been possible.

Preferably, said method further comprises the step of operating the computer to perform said copying step only on said user additionally issuing a transfer command. This provides a user interface which results in the user having greater control over whether the copying takes place.

Furthermore, in preferred embodiments, the method further comprises the step of operating the computer to perform, at least in the event that another source representation coincides with another storage representation, said copying step only on said user additionally selecting which of the source representations is to be copied. This has the advantage that the user can control which items are copied even if the relative spatial arrangement of the source representations and the storage representations is substantially the same.

In preferred embodiments, said method further comprises the step of operating the computer to display one or both of said groups within a visibly bounded group display area forming a portion of the output display area. By displaying one or both groups of representations in a display area that has a visible boundary, it is clearer to the user which representations belong to which group. Hence, the user is able to control the copying operation more quickly and reliably. One way of providing a visible boundary is to fill substantially the entire bounded group display area with a background which is distinguishable from other parts of the display. Another way of providing a visible boundary is to display a frame that follows said boundary.

Where one or both groups of representations is displayed on a distinguishable background, the method preferably further comprises the step of operating the computer to display in said bounded group display area, when said group displays overlap, said background, the source representations and the storage representations. When this feature is provided, the user is more easily able to position one or more data item representations so that they substantially coincide with storage representations.

In preferred embodiments there is provided a method of operating a computer to enable a user to cause the copying of one or more source data items from a source memory location to one or more destination fields in a destination memory location, said method comprising operating the computer to carry out the steps of any of the above embodiments and thereafter:

a) generate a destination group display comprising a plurality of destination representations representing respective destination fields in the destination part of memory;

b) move said storage group display responsive to user commands, wherein said storage representations move substantially as a group; and c) copy the storage data item represented by one of said storage representations to the destination field represented by one of said destination representations responsive to said user moving at least one of said storage and destination display groups such that said storage representation and said destination representation substantially coincide.

This has the advantage that a user can transfer a plurality of items selected from a group of source memory locations to a group of destination memory locations in one movement of the group of storage representations.

Preferably, said source group display fills substantially the entire output display area, said storage group display generation step thereafter overwrites parts of the source group display and said destination group display generation step overwrites said source group display without overwriting said storage group display.

This has the advantage that the computer can use substantially the whole display area in displaying the source group and the destination group, without hindering the use of the storage group to transfer data items represented in the source group to destination fields represented in the destination group.

Any of the above embodiments can be used in operating a computer to provide a database amendment tool. The above embodiments are especially suited to transferring data to and from the unevenly located data fields typical of a graphical representation provided under the control of a database program.

According to a second aspect of the present invention there is provided a computer readable object directly loadable into the internal memory of a digital computer, said object physically embodying software code portions which control the computer to carry out method steps according to the first aspect of the present invention.

According to a third aspect of the present invention there is provided an electromagnetic signal physically embodying computer readable code executable by a computer to control said computer to carry out method steps according to the first aspect of the present invention.

BRIEF DESCRIPTION OF THE DRAWINGS

There now follows, by way of example only, a description of specific embodiments of the present invention. The description is given with reference to the accompanying drawings in which:

FIG. 1 shows a personal computer;

FIGS. 2A to 2D show tables of a database stored on the hard disc of the computer;

FIGS. 3A to 3C show displays created by three respective processes in a database editing program running on the computer;

FIG. 4A shows a set of memory locations in the Random Access Memory (RAM) of the personal computer;

FIG. 4B shows a display created to help a user copy data items from the database;

FIGS. 4C and 4D are flow charts that illustrate processes used in provided a data copying method;

FIGS. 5A to 5D show the screen displays generated in a scenario which demonstrates the use of the data copying method.

DETAILED DESCRIPTION OF EXEMPLARY EMBODIMENTS

Figure 4C:
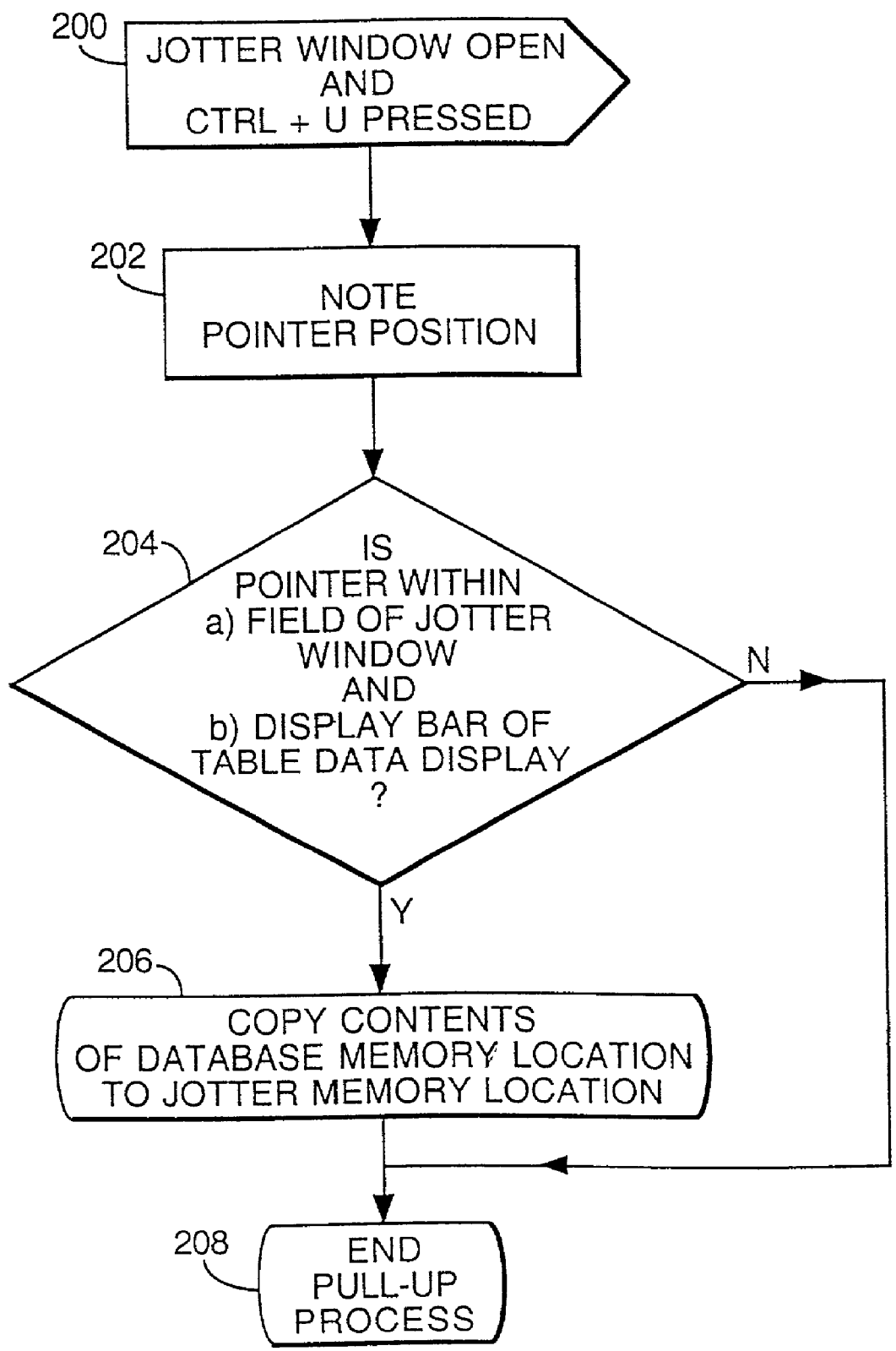

FIG. 1 shows an IBM PC 300PL personal computer having a central unit 10, a video monitor 12, a keyboard 14 and a mouse 16. The personal computer comprises well-known hardware components connected together in a conventional manner.

Known operating system software (e.g. Windows 95) is loaded into the computer's RAM when it is switched on and is executed to provide the user with a known WIMPS (Windows, Icons, Mouse, Pull-Down Menus) user interface.

A CD-ROM 18 encodes a database editing program which when run on the personal computer causes it to operate in accordance with the present embodiment.

The hard disc of the computer encodes (in addition to the operating systems, other programs and files) a customer database which is comprised of four tables, namely an index table (FIG. 2A), an address table (FIG. 2B), an order table (FIG. 2C), and an accounts table (FIG. 2D). Each of these tables is transferred to the computer's RAM when the database editor program is run.

The index table (FIG. 2A) is held in a first area of the computer's RAM and is divided into sections. As with all the sections, the section 19 relating to, say, Acme Co. Ltd contains a first memory location 20 storing alphanumeric data representing the company name. The memory location 22 following the first memory location 20 stores numeric data representing a customer number associated with Acme Co. Ltd. The following five memory locations 23A to 23E store numeric data representing up to five respective account numbers associated with the company. The last ten memory locations 24A to 24J contain numeric data representing the order numbers associated with the last ten orders received from Acme Co. Ltd. In many cases, the company may not have as many as five account numbers or ten purchase orders associated with it. In those cases, those memory locations which do not contain account or order numbers contain no data.

A second area of the RAM stores an address table (FIG. 2B). The address table (FIG. 2B) is divided into sections, each of which relates to one customer number. As with all the sections in the address table, the section 25 relating to Acme Co. Ltd contains the following data in memory locations 26 to 42:

a) customer name (in memory location 26);
b) location (in memory location 28);
c) building (in memory location 30);
d) town (in memory location 32);
e) country (in memory location 34);
f) postcode (in memory location 36);
g) telephone number (in memory location 38);
h) facsimile number (in memory location 40);
i) contact name (in memory location 42).

A third area of the RAM stores the order table (FIG. 2C) which is divided into sections, each of which represents a given order number. As with all the sections in the order table, the section 19 relating to Acme Co. Ltd contains seven memory locations which respectively contain alphanumeric data representing:

a) Customer Name (in memory location 46)
b) Contact Name (in memory location 48)
c) Product Name (in memory location 50)
d) Required by Date (in memory location 52)
e) Charge Type (in memory location 54)
f) Delivery Method (in memory location 56)
g) Level of Service (in memory location 58)

A fourth area of the RAM stores an accounts table (FIG. 2D). As with the other tables, the accounts table is arranged into sections 60. Each section 60 is associated with a given account number and is made up of memory locations storing the following alphanumeric data:

a) Customer Name (in memory location 62)
b) Contact Name (in memory location 64)
c) Current Invoice Date (in memory location 66)
d) Charges Raised (in memory location 68)

e) Telephone Number (in memory location 70)

f) Call Itemisation (in memory location 72)

g) Level of Service (in memory location 74)

Once the index, address, order and accounts tables have been loaded in the computer's RAM, the database editor program causes the computer to display an enquiry screen which prompts the user to enter a customer name using the keyboard. The index table is then searched to find the section (e.g. 19) of the index data relating to that customer name. Those skilled in the art of database programming will easily be able to generate a suitable arrangement of the index table and search algorithm to achieve the above step.

Having used the index table (FIG. 2A) to find the appropriate customer number (e.g. in memory location 22), the computer displays a customer address window (FIG. 3A) which substantially fills the screen of the monitor 12. The customer address window is rectangular in shape and comprises a framing area 80 which surrounds a current address data display area 82. The current address data display area 82 is also rectangular in shape and extends horizontally across from a vertical left-hand boundary 84 close to the left-hand edge of the window to a vertical right-hand boundary 86 close to the right-hand edge. In a vertical direction, the data display area extends upwards from a horizontal lower boundary 88 close to the bottom of the window to an upper horizontal boundary 90 about three-quarters of the way up the window. The framing area has one background colour and the data display area has a different background colour.

The upper framing area (i.e. the part which lies above the upper horizontal boundary 90), carries four display components. The uppermost display component is a rectangular program title bar 92 which almost fills the uppermost quarter of the upper framing area and has a different colour to the background colour of the framing area. The program title bar 92 itself carries left-justified text 94 which indicates that the database editor program has drawn the window. At its right-hand end the program title bar 92 carries two square buttons 96, 98. The left-hand button 96 carries a picture of a low horizontal bar and the right-hand button 98 carries a picture of a diagonal cross. Immediately below the program title bar 92 is a left-justified series of menu options 96 displayed in text form. Immediately below them the upper frame area carries a left-justified series of five square buttons (98 to 106). From left to right, the five buttons are labelled with representations of a notepad, a pound sign, a mobile phone, a pen and a house respectively. Immediately below them, nearly all the lowermost quarter of the upper framing area is occupied by a rectangular data display area title bar 108. The rectangular display area title bar is of the same colour as the program title bar 92 and carries at its left-hand end two items of text separated by a hyphen. The left-hand item of text indicates that the data in the data display area 82 has come from the address table (FIG. 2B). The right-hand item of text indicates the company name associated with the data displayed in the data display area 82. The right-hand item of text is found in the first memory location (26) of the section (25) whose other contents are displayed in the data display area 82.

The data display area 82 has nine horizontal display bars (110 to 124) which are arranged into a left-hand column of six display bars (110 to 120) and a right-hand column of two display bars (122, 124). Each of the field display bars (110 to 124) is a white rectangle and displays (although not shown in FIG. 3A) the alphanumeric data from a corresponding one of the memory locations (28 to 42) in the section (25) of the address table (FIG. 2B) associated with the current customer (in this example, Acme Co. Ltd.). A text label is presented to the left of each of the display bars (110 to 124) which indicates which of the memory locations in the current section have their contents shown in the display bar to the right of the label. In this example the display bar 110 displays the data contained in the 'contact name' memory location (42) of the section (25) of the address table (FIG. 2B) that relates to Acme Co. Ltd.

The display further carries a screen pointer 128, the position of which is controllable by the user using the mouse 16. If the screen pointer 128 coincides with a data display bar 110 to 124 then it is displayed as a thin vertical line, otherwise it is displayed as an arrow. When the address window is first displayed, a flashing cursor appears in the first display bar 110. By manipulating the mouse and the keyboard in a known manner a user is able to edit the contents of the associated memory locations (28 to 42) directly. For example, were the user to 'click on' the display bar 112 and then type 'Floor 2', then the alphanumeric string 'Floor 2' would be entered in the memory location 28 and replace whatever data was already held in that memory location. The changes the user makes in this way are echoed in the display bars 110 to 124.

A skilled programmer will easily be able to provide computer code executable to generate the display shown in FIG. 3A. Also, such a programmer will be able to provide code that gives the user with a graphical user interface allowing the user to amend the contents of the address table via the mouse and keyboard. Furthermore, he or she could generate code which allows to user to control the operation of the program via the buttons 96, 98 and the pull-down menus which depend from the options 96.

On the user manipulating the mouse to move the screen pointer 128 over the 'mobile phone' button 102 and pressing the left-hand mouse button, the program generates an orders screen (FIG. 3B). The program uses the current index data to find the section (44) of the orders table (FIG. 2C) which corresponds to the most recent order placed by the current customer. The display of the current order data is then generated in an analogous way to the generation of the display of the address data.

Analogous operations are carried out when the user clicks on the 'pound sign' button 100 which causes the computer to generate an accounts display (FIG. 3C).

On the user clicking on the 'house' button 106, the program returns to the enquiry screen mentioned above, thereby enabling the user to view and edit the sections of the database which relate to another customer.

On the user clicking on the 'notepad' icon 98, the program controls the computer to set aside six memory locations (FIG. 4A: 150 to 160) in the computer's RAM. Thereafter, the computer updates whatever screen display is currently active by adding a rectangular jotter window 162 (FIG. 4B) to the display. The jotter window 162 is approximately square in shape and fills around one fifth of the area of the display screen of the monitor 12 and comprises a framing area 163 which surrounds a current jotter data display area 164. The current jotter data display area 164 is also rectangular in shape and extends horizontally across from a vertical left-hand boundary 166 close to the left-hand edge of the window to a vertical right-hand boundary 168 close to the right-hand edge. In a vertical direction, the data display area extends upwards from a horizontal lower boundary 170 about one eighth of the way up the window to an upper horizontal boundary 172 about seven-eighths of the way up the window. The jotter window framing area 163 is of a background colour which differs from the background colour of the address display data area 82. As will be explained below, the user can control whether the jotter data display area 164 is provided with a background or not. When a background is present, it is of a colour that is distinguishable both from the background colour of the address display data area 82 and from the colour of the display bars (110 to 124).

The upper framing area of the jotter window 162 (i.e. the part which lies above the upper horizontal boundary 172), carries a jotter title bar 174 which almost fills the upper framing area and is of a different colour to the background colour of the framing area. The jotter title bar 174 itself carries an icon 93 and left-justified text 94 which indicate that the jotter process of the database editor program has drawn the window 162. At its right-hand end the title bar 174 carries two square buttons 176, 178. The left-hand button 176 carries a picture of a low horizontal bar and the right-hand button 178 carries a picture of a diagonal cross.

The jotter data display area 164 has a column of six rectangular display fields (182 to 192), the four corners of each of which are marked with black right-angles 180. Each of the jotter fields displays (182 to 192) (although not shown in FIG. 3A) the alphanumeric data from a corresponding one of the jotter memory locations (FIG. 4A: 150 to 160).

The jotter window 162 behaves like a normal program window in that:

a) the user can move it around the display screen by dragging the jotter title bar 174;

b) the jotter process can be stopped by clicking on the top right-hand button 178, or minimised by clicking on the left-hand button 176; and c) 'focus' can be shifted to the jotter window 162 by clicking on its title bar 174—this means that the screen cursor 129 will appear in the most recently amended jotter field 182 to 192, and data entered by the keyboard will be entered into the corresponding memory location (FIG. 4A: 150 to 160), and any such amendments will be echoed in the jotter field 182 to 192. As is usual, the fact that 'focus' is currently on the jotter window 162 is illustrated by its title bar 174 being darker than the title bar of the address window. 'Focus' passes to the jotter window 162 when it is first displayed; and d) If the screen pointer 128 coincides with a jotter field (182 to 192) then it is displayed as a thin vertical line, otherwise it is displayed as an arrow.

Unlike a normal program window, the jotter window:

a) is not overwritten when 'focus' is shifted back to the address data window (FIG. 3A);

b) In addition to the jotter window 162 being 'draggable' by its title bar 174, it is also 'draggable' by any other position within the window;

c) The lower framing area of the jotter window 162 (i.e. the part which lies below the lower horizontal boundary 170), carries an opacity control bar 194 which almost fills the lower framing area and is of the same background colour as the upper framing area 174.

The opacity control bar 194 carries a visual representation of a slider 196 which is movable between a left-hand end and a right-hand end. By moving the screen pointer 128 over the slider and 'dragging' it to the right-hand end, the user can cause the background of the jotter display area 164 to overwrite the parts of the address screen display that are located within the jotter display area 164. In contrast, by dragging the slider 196 to the left-hand end, the user can cause the parts of the address display within the jotter display area to overwrite the background of the jotter display area 164. Text either side of the slider's range is presented to remind the user of its function. When the slider 196 is at a position intermediate its ends, the background jotter data display area 164 overwrites the parts the address data display to a degree controllable by the position of the slider 196. It will be realised that the jotter data (not shown) and the right-angles 180 will always be visible to the user, whereas any items of the address data display will only be visible in the jotter data display area 164 if the slider 196 is away from its rightmost position.

A skilled programmer will easily be able to write computer code executable to generate a data store in memory (FIG. 4A) and a jotter window 162 which have the above properties.

The database editor program also includes a pull_up process (FIG. 4C) and a punch_through process (FIG. 4D).

The pull_up process process begins in step 200 if the jotter window 162 is displayed and the user presses CTRL+U on the keyboard 14. The program causes the computer to find the position (step 202) of the screen pointer 128. Once the position has been found, the computer is controlled (in step 204) by the program to determine whether the screen pointer 128 is positioned both within one of the jotter fields (182 to 192) and within one of the table data display bars (e.g. 110 to 124 if the address screen is being shown).

If the pointer 128 and jotter window 162 are not so positioned, then the pull-up process ends at step 208. On the other hand, if the pointer 128 and jotter window 162 are so positioned, then the contents of the database table data (e.g. the contents of one of the memory locations 28 to 42, 48 to 58, 64 to 74) associated with the display bar (110 to 124) are copied (step 206) to the jotter memory location (FIG. 4A: 150 to 160) associated with the jotter field (182 to 192).

The punch_through process (FIG. 4D) begins in step 210 if the jotter window 162 is displayed and the user presses CTRL+D on the keyboard 14. The steps of the punch_through process are identical to those of the pull_up process, save for the copying step. In the punch_through process, the copying step 216 involves copying the contents of the jotter memory location (FIG. 4A: 150 to 160) associated with the jotter field (182 to 192) to the database table memory location (e.g. to one of memory locations 28 to 42, 48 to 58, 64 to 74) associated with the display bar (110 to 124).

An example of how a computer operating in accordance with the present embodiment might be used as a database amendment tool will now be given with reference to FIGS. 5A to 5D.

A representative of the company which maintains the database, runs the database editing program on their computer so as to cause it to display the enquiry screen on the monitor 12. An employee of a customer (Acme Co. Ltd, say) telephones the company representative and requests that the address details for Acme Co. Ltd are updated. The company representative enters the name 'Acme Co. Ltd' using the computer's keyboard 14. Following the process explained above the computer will then display the contents of the section (25, FIG. 2B) of the address table which relates to Acme Co. Ltd. The company representative might then update the contents of that section directly by entering replacement alphanumeric data using the keyboard. The display might then appear as in FIG. 5A.

The Acme Co. Ltd employee might then indicate that invoices and purchases are also to be sent to the same person. Realising that the same information must be entered into a further two parts of the database, the company representative clicks on the jotter icon 98 which, as explained above, causes the jotter window 162 to appear (see FIG. 5B) on the screen of the monitor 12.

Figure 5C:
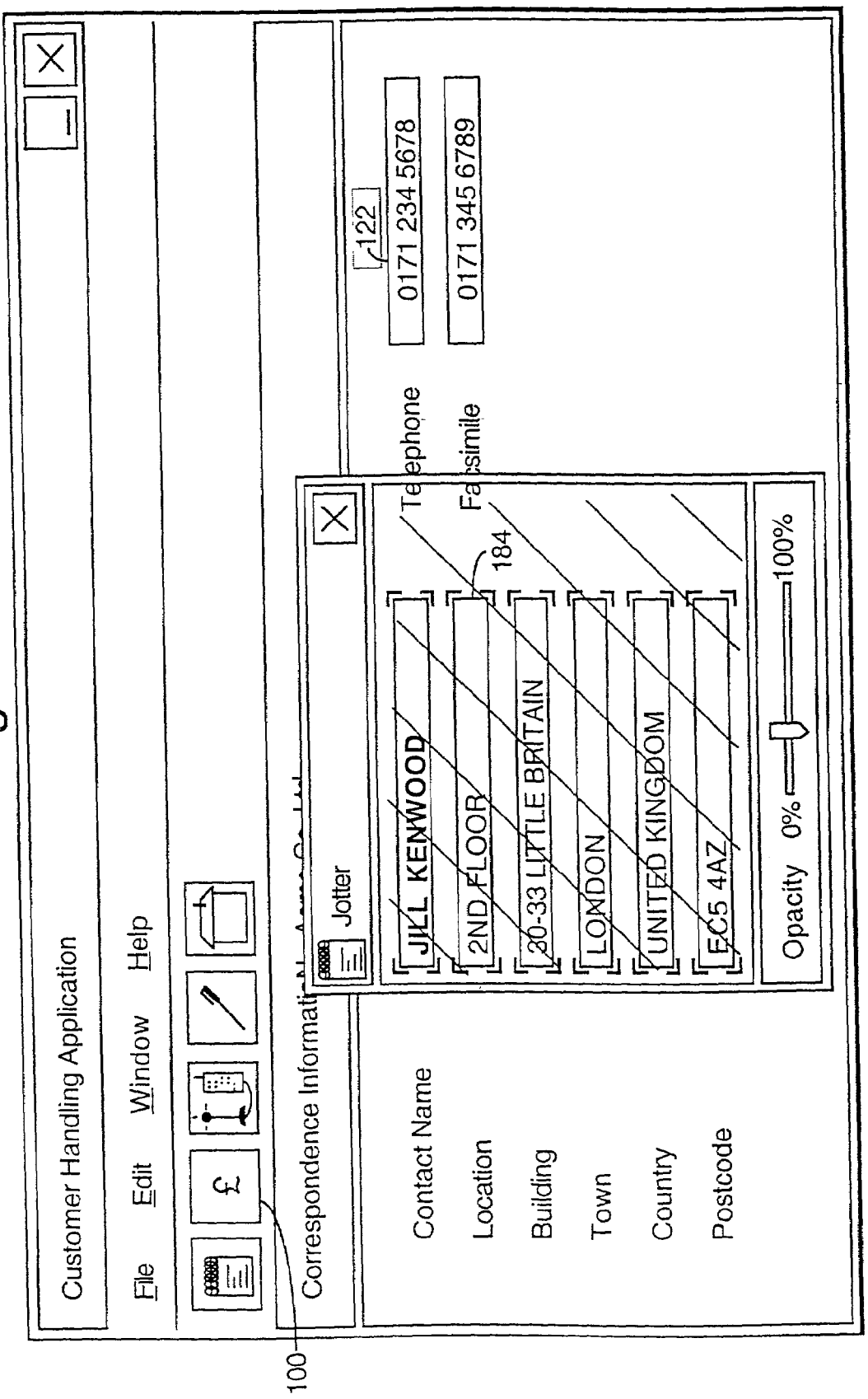

Using the mouse 16, the representative then positions the pointer 128 over the first jotter field 182 and drags the jotter window 162 to a position such that the uppermost jotter field 182 is coincident with the top-left display bar 110. The user then enters CTRL+U on his or her keyboard. The process illustrated in FIG. 4C is then performed to copy the name the representative has just entered into the relevant memory location 42 of the address table (FIG. 2B) of the database to the first jotter field memory location 150. Immediately after that operation the screen will appear as shown in FIG. 5C. The representative can issue a similar sequence of commands to cause the telephone number represented in the top-right display bar 122 to be copied to the memory location 152 associated with the second jotter field 184.

Figure 5D:
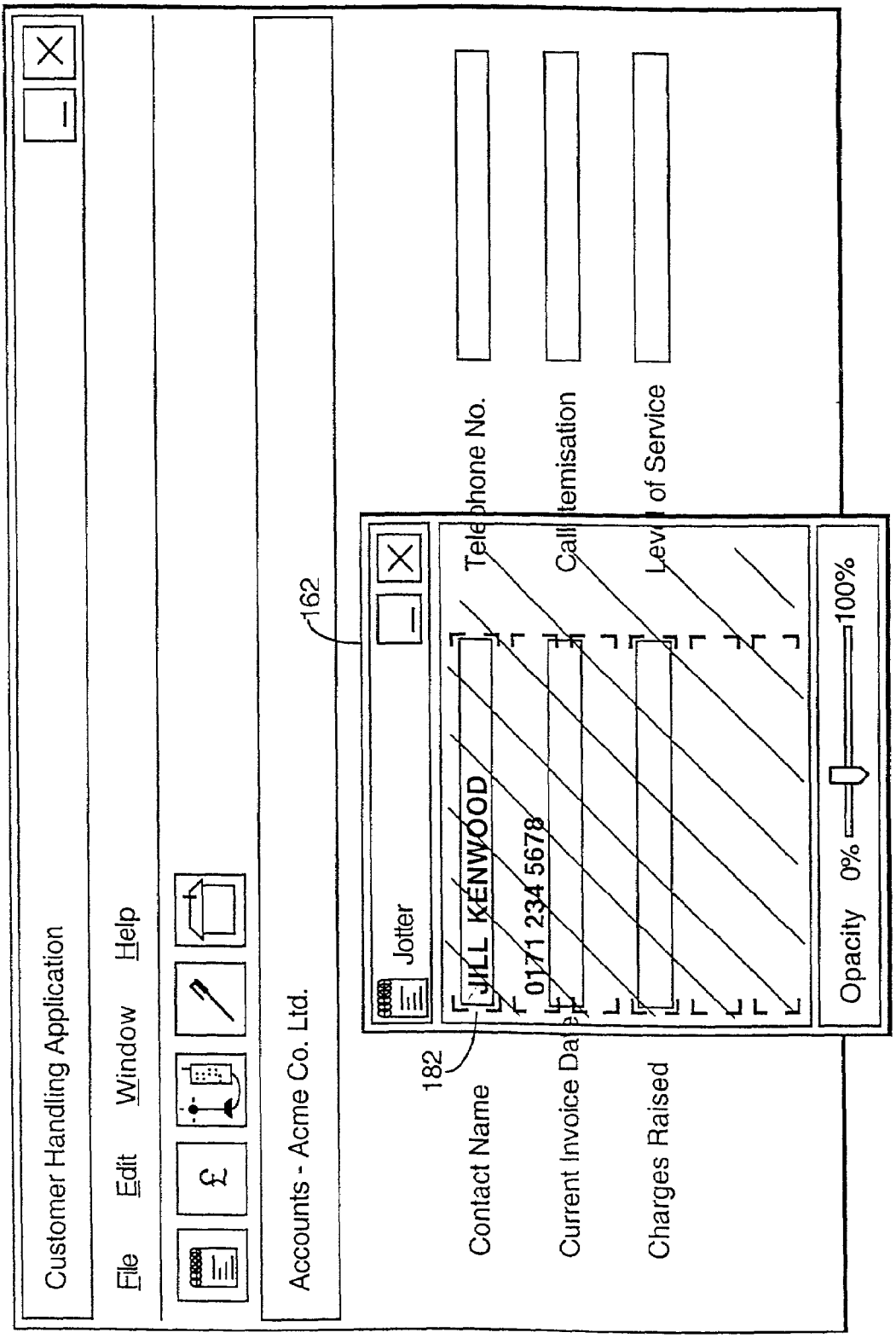

Once the two pieces of address data have been visibly recorded, the representative can click on the 'pound sign' icon 100 to cause the contents of the section 60 of the accounts table (FIG. 2D) to be displayed instead of the contents of the address table. The user then moves the jotter window 162 (which is not overwritten in the replacing of the address screen by the accounts screen) to a position where the first jotter field 182 is aligned with the top-left display bar of the accounts table data display window. The display on the monitor 12 might then appear as shown in FIG. 5D. By moving the screen pointer over the so aligned jotter field 182 and top-right display bar, and pressing CTRL+D on the keyboard 14, the user causes the punch_through process of FIG. 4D to be performed. Data representing the name of the new contact at Acme Co. Ltd. is thereby copied to the appropriate memory location 64 in the accounts table (FIG. 2D).

It will be realised that a similar sequence of operations might then be used to update the appropriate telephone number data in the accounts table (i.e. memory location 70) and also the contact name data in the orders table (i.e. memory location 48).

It will be seen that the above embodiment enables a user to copy a selected subset of data displayed in, say, the address display window (FIG. 3A) to the jotter window 162. Indeed, as the display bars (110 to 120) of that screen and jotter fields (182 to 192) are similarly spaced the user can copy a selected subset of the address data to the jotter memory fields (FIG. 4A) without moving the jotter window between copying operations. Such a feature might be especially useful were the computer to be displaying the contents in the form of a table or a spreadsheet.

It will also be seen how the display of a combination of both the jotter window 162 and the address, accounts, or order display allows the user to copy data from one of the tables (FIG. 2A, 2B, 2C) to another without losing sight of the jotter data whilst nevertheless allowing the address, order and accounts displays to substantially fill the screen of the monitor 12.

It should be noted that the jotter window could lack the right angles 180, the user, for example, knowing that six equally spaced fields are present and aligning the fields and display bars accordingly.

The jotter data display area 164 might display only the right-angles 180 and jotter data and not include any part of the display relating to the address, accounts or order display. Even though the display bars (110 to 124) would then not be visible in the jotter window 162, the user would still be able to position the window correctly by aligning the display bar label (126, FIG. 3A for example) with the jotter field to which he or she wished the data to be copied.

What is claimed is:

1. A method of operating a computer to enable a user to cause the copying of one or more source data items from a source memory location to one or more storage fields in a storage memory location, said method comprising operating the computer to:
   a) generate a display having:
      a source group display comprising a plurality of spatially separated source representations arranged in a first configuration, said source representations representing respective source data items stored in said source memory location; and
      a storage group display comprising a plurality of spatially separated storage representations arranged in a second configuration, said storage representations representing respective storage fields in the storage memory location;
   b) responsive to user commands, move at least one of said group displays, maintaining said configuration of said group display during movement of said group display; and
   c) in response to:
      i) said movement resulting in one or more overlying relationships in which a source representation overlies a storage representation or vice-versa;
      simultaneously display said source representation and said storage representation in the region in which said source representation overlies said storage representation or vice-versa; and in response to the user additionally:
      ii) selecting one of the overlying relationships by issuing a transfer command selecting the overlying relationship;
      copy the source data item represented by the source representation involved in the selected overlying relationship to the storage field represented by the storage representation involved in the overlying relationship.

2. A method according to claim 1 further comprising operating the computer to display one or both of said groups within a bounded group display area forming a portion of the output display area.

3. A method according to claim 2 further comprising operating the computer to fill a portion of the bounded group display area with a background which is distinguishable from other parts of the display.

4. A method according to claim 3 further comprising operating the computer to simultaneously display in said bounded group display area, where said group displays overlap, said background, the source representations and the storage representations.

5. A method of operating a computer to provide a database amendment tool which method comprises the method of claim 4.

6. A computer readable object directly loadable into the internal memory of a digital computer, said object physically embodying software code portions which control the computer to operate in accordance with the method of claim 4.

7. A method of operating a computer to provide a database amendment tool which method comprises the method of claim 3.

8. A computer readable object directly loadable into the internal memory of a digital computer, said object physically embodying software code portions which control the computer to operate in accordance with the method of claim 3.

9. A method according to claim 2 wherein a border of said group display area is indicated by a frame that follows said border.

10. A method of operating a computer to provide a database amendment tool which method comprises the method of claim 9.

11. A computer readable object directly loadable into the internal memory of a digital computer, said object physically embodying software code portions which control the computer to operate in accordance with the method of claim 9.

12. A method of operating a computer to provide a database amendment tool which method comprises the method of claim 2.

13. A computer readable object directly loadable into the internal memory of a digital computer, said object physically embodying software code portions which control the computer to operate in accordance with the method of claim 2.

14. A method of operating a computer to provide a database amendment tool which method comprises the method of claim 1.

15. A computer readable object directly loadable into the internal memory of a digital computer, said object physically embodying software code portions which control the computer to operate in accordance with the method of claim 1.

16. A method of operating a computer to enable a user to cause the copying of one or more source data items from a source memory location to one or more destination fields in a destination memory location, said method comprising:
   a) generate a display having:
   a source group display comprising a plurality of spatially separated source representations arranged in a first configuration, said source representations representing respective source data items stored in said source memory location; and
   a storage group display comprising a plurality of spatially separated storage representations arranged in a second configuration, said storage representations representing respective storage fields in the storage memory location;
   b) responsive to user commands, move at least one of said group displays, maintaining said configuration of said group display during movement of said group display; and
   c) in response to:
      i) said movement resulting in one or more overlying relationships in which a source representation overlies a storage representation or vice-versa;
      simultaneously display said source representation and said storage representation in the region in which said source representation overlies said storage representation or vice-versa;
      and in response to the user additionally:
      ii) selecting one of the overlying relationships by issuing a transfer command selecting the overlying relationship;
   d) generate a destination group display comprising a plurality of spatially separated destination representations arranged in a third configuration, said destination representations representing respective destination fields in the destination part of memory;
   wherein said storage group display is movable by the user, said second configuration of said storage group display being maintained during movement of said group display; and
   e) in response to:
      i) said movement resulting in one or more subsequent overlying relationships in which a storage representation overlies a destination representation;
      simultaneously display said storage representation and said destination representation in the region in which said storage representation overlies said destination representation or vice-versa;
      and in response to the user additionally:
      ii) selecting one of the subsequent overlying relationships by issuing a transfer command selecting the subsequent overlying relationship;
      copy the storage data item represented by the storage representation involved in the selected subsequent overlying relationship to the destination field represented by the destination representation involved in the subsequent overlying relationship.

17. A method according to claim 16 wherein:
   said source group display fills the entire output display area;
   said storage group display generation step overwrites parts of the source group display; and
   said destination group display generation step overwrites said source group display without overwriting said storage group display.

18. A method of operating a computer to provide a database amendment tool which method comprises the method of claim 17.

19. A computer readable object directly loadable into the internal memory of a digital computer, said object physically embodying software code portions which control the computer to operate in accordance with the method of claim 17.

20. A method of operating a computer to provide a database amendment tool which method comprises the method of claim 16.

21. A computer readable object directly loadable into the internal memory of a digital computer, said object physically embodying software code portions which control the computer to operate in accordance with the method of claim 16.

22. A computer for copying of one or more source data items from a source memory location to one or more storage fields in a storage memory location, said computer comprising:
   a) a display having:
   a source group display comprising a plurality of spatially separated source representations arranged in a first configuration, said source representations representing respective source data items stored in said source memory location; and
   a storage group display comprising a plurality of spatially separated storage representations arranged in a second configuration, said storage representations representing respective storage fields in the storage memory location;
   b) means responsive to user commands for moving at least one of said group displays, maintaining said configuration of said group display during movement of said group display; and
   c) in response to:
      i) said movement resulting in one or more overlying relationships in which a source representation overlies a storage representation or vice-versa; simultaneously display said source representation and said storage representation in the region in which said source representation overlies said storage representation or vice-versa;
      and in response to the user additionally:
      ii) selecting one of the overlying relationships by issuing a transfer command selecting the overlying relationship;
      the computer copying the source data item represented by the source representation involved in the selected overlying relationship to the storage field represented by the storage representation involved in the overlying relationship.

23. The computer according to claim 22 wherein the computer displays one or both of said groups within a bounded group display area forming a portion of the output display area.

24. The computer according to claim 22 wherein the computer fills a portion of the bounded group display area with a background which is distinguishable from other parts of the display.

25. The computer according to claim 24 wherein the computer simultaneously displays in said bounded group display area, where said group displays overlap, said background, the source representations and the storage representations.

26. The computer according to claim 22 wherein a border of said group display area is indicated by a frame that follows said border.

\* \* \* \* \*